United States Patent [19]

Carpenter

[11] Patent Number: 5,203,124
[45] Date of Patent: Apr. 20, 1993

[54] WIRE MESH CONVEYOR ABRASIVE MACHINE AND ABRASIVE RETURN SYSTEM THEREFOR

[75] Inventor: James H. Carpenter, Hagerstown, Md.

[73] Assignee: Pangborn Corporation, Hagerstown, Md.

[21] Appl. No.: 695,392

[22] Filed: May 3, 1991

[51] Int. Cl.$^5$ .............................................. B24C 3/00
[52] U.S. Cl. ........................................ 51/410; 51/417; 51/418; 198/712
[58] Field of Search ................. 51/410, 417, 418, 431, 51/432; 198/712, 550.11, 549

[56] References Cited

U.S. PATENT DOCUMENTS

| | | | |
|---|---|---|---|
| 3,696,565 | 10/1972 | Claeys | 51/417 X |
| 3,921,336 | 11/1975 | Nishio et al. | 51/418 |
| 4,659,391 | 4/1987 | Kuehn | 51/418 X |

FOREIGN PATENT DOCUMENTS

| | | | |
|---|---|---|---|
| 1144147 | 2/1963 | Fed. Rep. of Germany | 51/417 |
| 2363745 | 12/1973 | Fed. Rep. of Germany | 198/712 |
| 3204162 | 11/1982 | Fed. Rep. of Germany | 51/418 |

*Primary Examiner*—James G. Smith
*Attorney, Agent, or Firm*—Charles E. Brown

[57] ABSTRACT

This relates to a cleaning machine which employs blast wheels to throw abrasive particles against a workpiece to be cleaned. The cleaning machine is of a simple construction and employs two wire mesh belts through which abrasive particles may freely pass. A first of these belts extends longitudinally through the machine and serves to support workpieces or articles to be cleaned. The workpieces are cleaned by blasts of abrasive particles from opposite sides of the belt and from above and below the belt. This first belt may be considered extending longitudinally of the cleaning machine. The abrasive particles fall into a bottom collection trough and are removed by an abrasive particle collection system which includes a second wire mesh belt through which abrasive particles can freely flow into the collection trough. The second belt is also vertically disposed, but extends transversely of the first belt. The second belt carries a series of buckets for removing collected materials including abrasive particles from the collection trough and dumping the materials onto an upper run of the second belt through which the collected materials freely flow into collection bins. The collected material flows in a curtain from each of the bins through which an air blast passes to remove foreign material from the abrasive particles, after which the abrasive particles fall into respective supply hoppers for the blast wheels.

10 Claims, 4 Drawing Sheets

WIRE MESH CONVEYOR ABRASIVE MACHINE AND ABRASIVE RETURN SYSTEM THEREFOR

This invention relates in general to new and useful improvements in abrasive cleaning machines and more particularly to an abrasive cleaning machine utilizing a wire mesh conveyor to convey small articles to be cleaned for passing such articles through blasts of abrasive particles.

BACKGROUND OF THE INVENTION

It is well known to convey articles to be cleaned by conveying such articles through blasts of abrasive particles from blast wheels. It is also well known to utilize a bucket-type conveyor for returning spent abrasive particles to a supply source of abrasive particles for the blast wheels. However, such machines have generally been very large machines and a complex and thus expensive.

SUMMARY OF THE INVENTION

In accordance with this invention it is proposed to provide a very simple abrasive particle cleaning machine wherein articles to be cleaned by a blast of abrasive particles are transported by way of a wire mesh belt through which abrasive particles are free to flow whereby articles to be cleaned may receive blasts of abrasive particles from above with such abrasive particles freely flowing through the were mesh conveyor to a lower trough for return. Furthermore, the open mesh of the conveyor belt permits blast wheels to be also mounted below the articles to be cleaned so that the articles may be blasted by way of abrasive particle blasts from below. In this manner, the entire outer surface of the article to be cleaned is subject to abrasive particle blasts.

It is also proposed to provide an abrasive particle return system which utilizes a conveyor of an open construction whereby abrasive particles are free to flow through the belt. More particularly, it is proposed to utilize a belt which is of an open wire mesh construction. In this way spent abrasive particles flowing into a collection trough may freely pass through the wire mesh conveyor. Also, when the spent abrasive particles are transported to the top of the machine utilizing buckets and the abrasive particles are dumped from the buckets, the abrasive particles may be dumped onto an upper run of the wire mesh belt for passage therethrough.

In particular, it is a feature of the invention to provide an abrasive cleaning machine which includes a first wire mesh belt which functions as a conveyor for workpieces to be cleaned, the wire mesh be it being disposed in a generally vertical longitudinal plane. A somewhat similar belt is utilized to transport spent abrasive particles back to the top of the machine with this wire mesh belt lying in a generally vertical transverse plane. In other words, the two wire mesh belts are disposed in planes which are generally at right angles to one another.

Yet another feature of the invention is to provide a novel connection between a flexible endless belt and buckets for conveying spent abrasive particles, the belt being of a wire mesh construction and in a section longitudinally of such belt, the belt being formed of a plurality of interlocking loops. The buckets are secured to the belt by inserting through aligned loops transversely of the belt bars to which the buckets are secured. Preferably each of the buckets is secured to the belt by way of two bars with each bucket being fixedly secured to one of two bars and having a resilient connection with the other of the bars.

Finally, it is proposed to utilize a simple bucket construction which is V-shaped in cross section including one wall disposed remote from and parallel to the belt and a second wall sloping towards the belt whereby the bucket is configurated to automatically pick up spent abrasive particles and further to discharge such spent abrasive particles when the buckets reach the top of the belt and move generally horizontally along an upper run of the belt.

With the above and other objects in view that will hereinafter appear, the nature of the invention will be more clearly understood by reference to the following detailed description, the appended claims, and the several views illustrated in the accompanying drawings.

FIG. 4 is a fragmentary vertical sectional view taken generally along the line 4—4 of FIG. 3 and shows the specific supporting of the buckets as they pass along an upper run of the belt therefor.

FIG. 6 is another fragmentary vertical sectional view taken generally along the line 6—6 of FIG. 3 and shows generally the mounting of the spent abrasive return belt at a corner of its path of travel.

Figure 1:
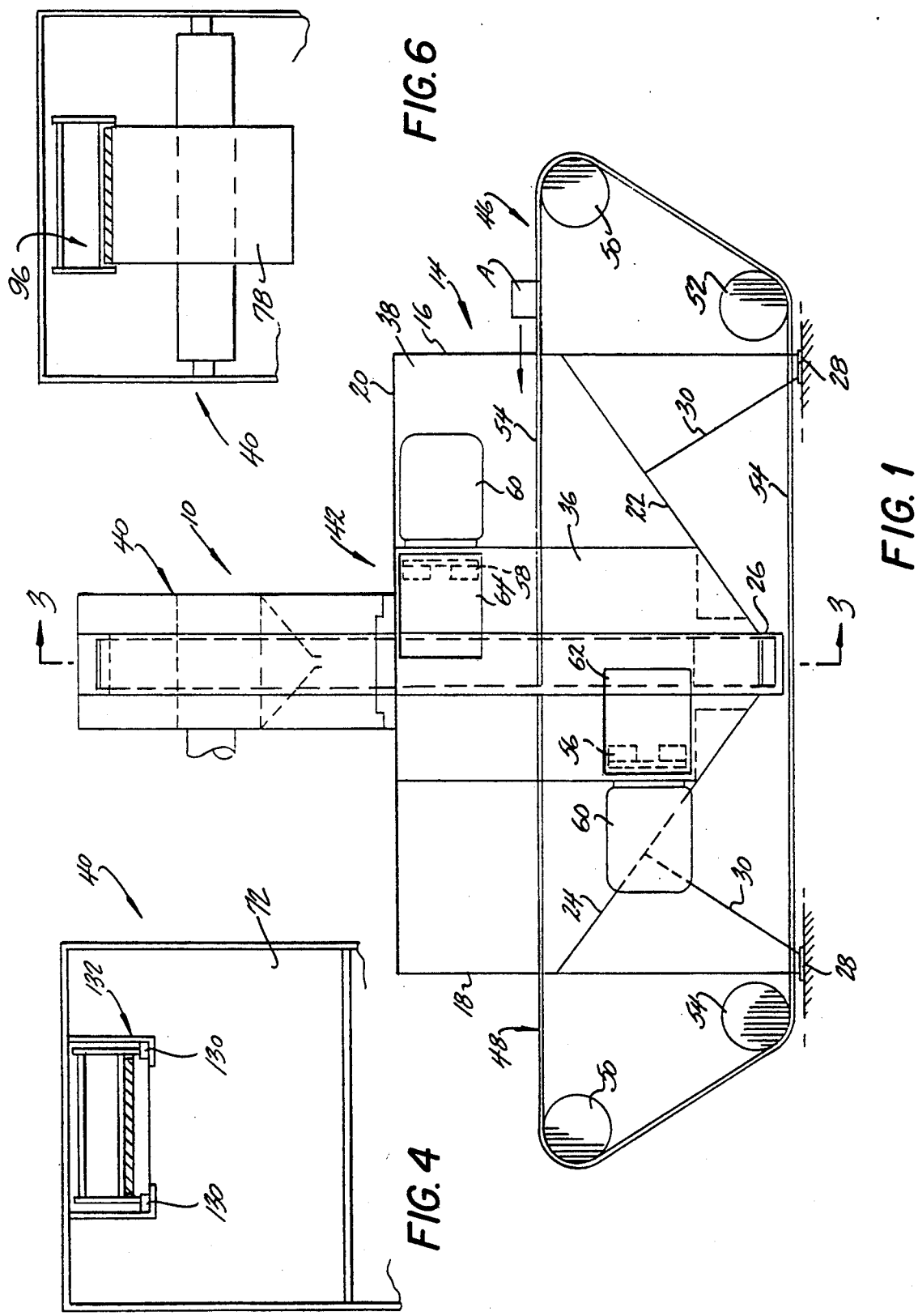
FIG. 1 is an elevational view of the machine and shows the general details thereof.
Figure 2:
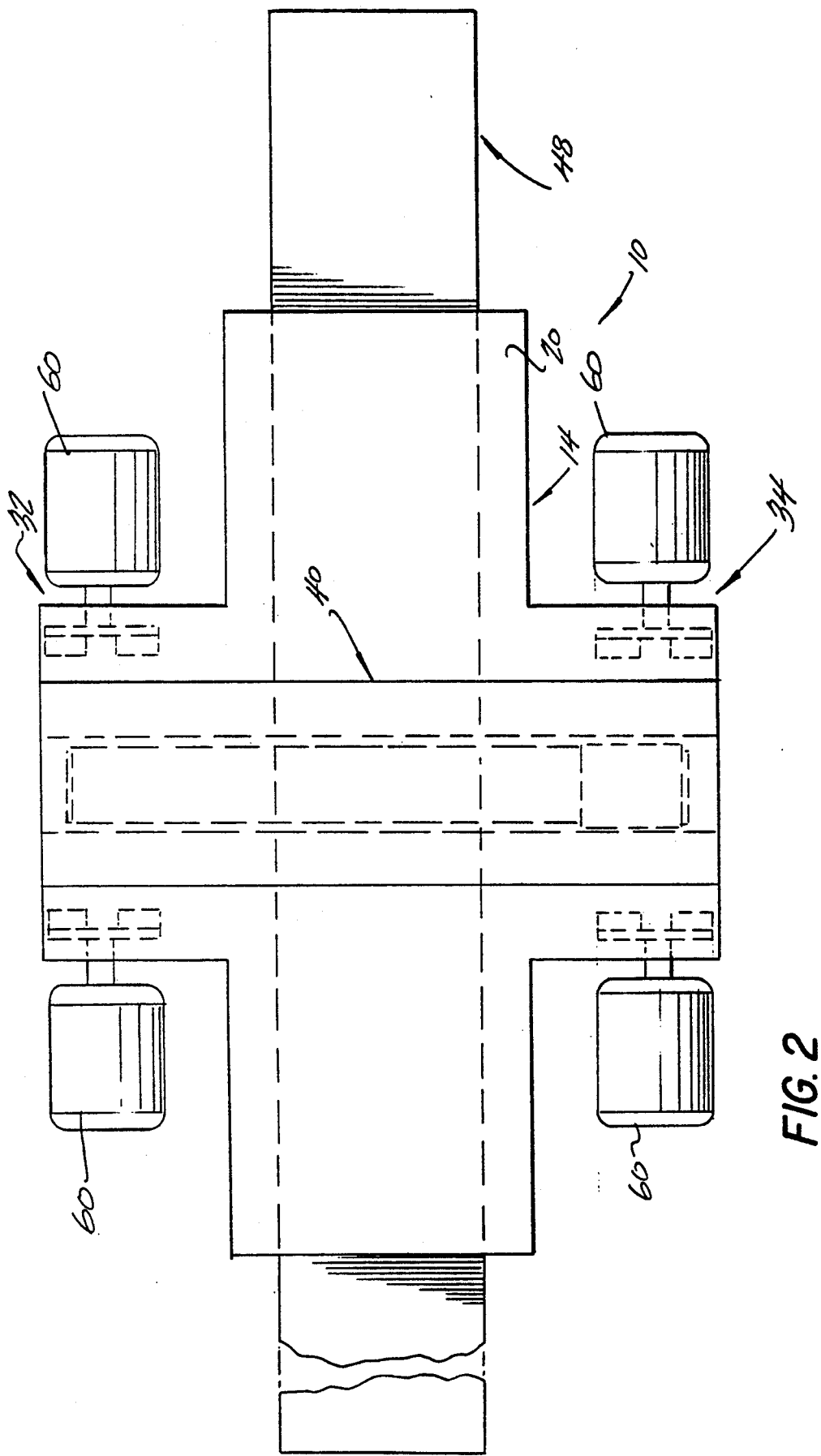
FIG. 2 is a top plan view of the machine of FIG. 1.

Referring now to the drawings in detail, reference is first made to FIGS. 1 and 2 wherein there is illustrated the overall details of a cleaning machine which is the subject of this invention, the machine being generally identified by the numeral 10. The machine 10 includes a multiple part housing generally identified by the numeral 12. The housing 12 includes a primary housing member 14 which includes a pair of end walls 16, 18, connected together at their upper edges by a top wall 20. The end walls 16, 18 have connected thereto intermediate their height converging downwardly sloping bottom walls 22, 24 which are joined to upper edges of a bottom trough 26. The end walls 16, 18 are mounted on a bottom mounting plate 28. Each mounting plate is connected to a respective one of the bottom walls 22, 24 by a brace 30.

It is to be understood that the housing portion 14 extends longitudinally as is best shown in FIG. 2 and is provided with central transverse extensions 32, 34 as is also shown in FIG. 2, central portions of the bottom walls 22, 24 are transversely extending to form the bottoms of the housing portions 32, 34.

Each of the housing extensions 32, 34 further include side walls 36 closing the opposite sides of the housing 12. The housing portion 14 is also provided with side wall members 38.

The housing 12 further includes a centrally located upwardly projecting and transversely extending housing portion 40 which has a bottom opening into the top of the housing portion 14. As is best shown in FIG. 2, the housing portion 40 is narrower than the housing extensions 32, 34.

Furthermore, each of the ends 16, 18 is provided with an intermediate height opening 42 and a lower opening 44.

The cleaning machine 10 includes an article conveyor generally identified by the numeral 46. The article conveyor 46 is only schematically illustrated and is in the form of an endless belt 48. As will be described in more detail hereinafter, the endless belt 48 is preferably of an open mesh wire construction. The belt 48 is supported by two upper rollers 50 and two lower rollers 52 of which one is driven. The details of the rollers 50, 52 and the manner in which they are supported relative to the housing 12 forms no part of this invention and has not been specifically illustrated.

It is to be noted, however, that the belt 48 has an upper run 54 which extends through the openings 42 and longitudinally of the housing 12. The belt 48 also includes a lower run 53 which extends through the openings 44 a small distance above a supporting surface 28 for the cleaning machine 10 and beneath the transversely extending trough 26 as is clearly shown in FIG. 1.

As is schematically illustrated in FIG. 1, articles A to be cleaned are placed on the right end of the upper run 54 and pass into the housing portion 14 within which the articles are showered with blasts of abrasive particles. The cleaned workpieces A exit off of the left end of the upper run 54.

Each of the housing extensions 32, 34 has mounted therein a lower blast wheel 56 and an upper blast wheel 58 which are carried by external motors 60 and which are mounted on vertical transversely extending walls of the housing extensions 32, 34 as is best shown in FIGS. 1 and 2. Access to the blast wheels 56, 58 is obtained through doors 62, 63 in the walls 36 as is best shown in FIG. 1.

It is to be understood that the belt 48 being of an open mesh wire construction not only permits abrasive particles to freely pass through the belt 48 from the upper blast wheels 58, but also permits the lower blast wheels 56 to clean the workpieces A from the undersides of such workpieces. It will also be readily apparent from FIG. 1 that spent abrasive particles and matter removed from the workpieces will fall onto the sloping bottom walls 22, 24 and be directed down into the trough 26. Thus the trough 26 is a collection trough for spent abrasives and foreign matter removed thereby.

Figure 3:
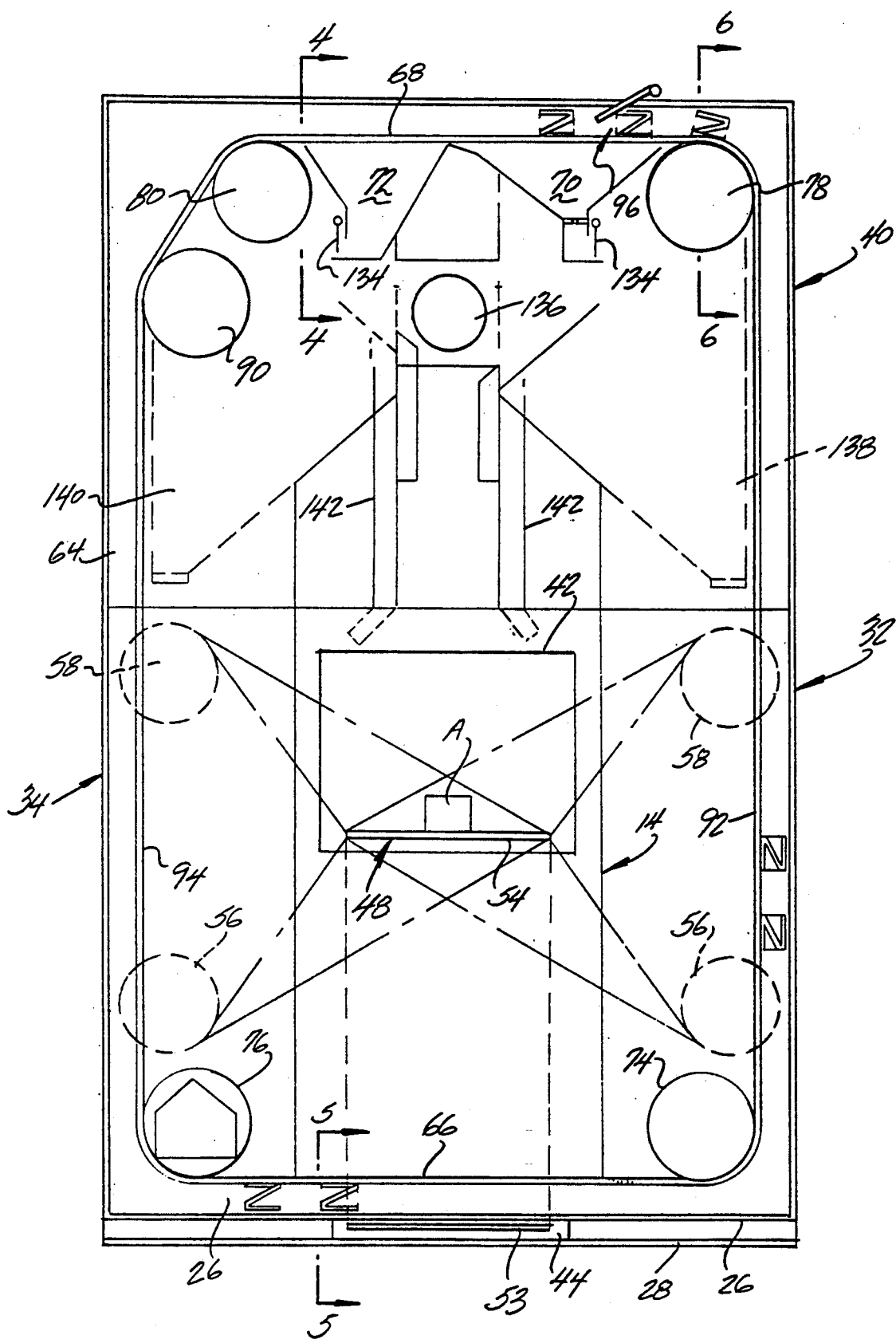
FIG. 3 is a transverse vertical sectional view taken generally along the line 3—3 of FIG. 1 and shows the specifics of the internal construction of the machine.

Another feature of the invention is the circulation of the abrasive particles. As is best shown in FIG. 3, this is accomplished by means of the second belt 64 which also lies in a vertical plane, but is disposed generally at right angles to the belt 48. The belt 64, which is a transverse belt, includes a lower run 66 which is associated with the abrasive particle collection trough 26 and an upper run 68 which is disposed within the housing portion 40 and overlies a pair of collection bins 70, 72. The belt 64 assumes a generally rectangular configuration and is supported by a pair of lower rollers 74, 76 and a pair of upper rollers 78, 80 as well as an intermediate roller 90. The upper roller 80 is adjustable and functions as a take-up roller. The roller placement result's in the belt 64 having a vertical upwardly directed run 92 and a vertical downwardly directed run 94. The belt 64 is driven by one of the several rollers, preferably the roller 78.

Figure 8:
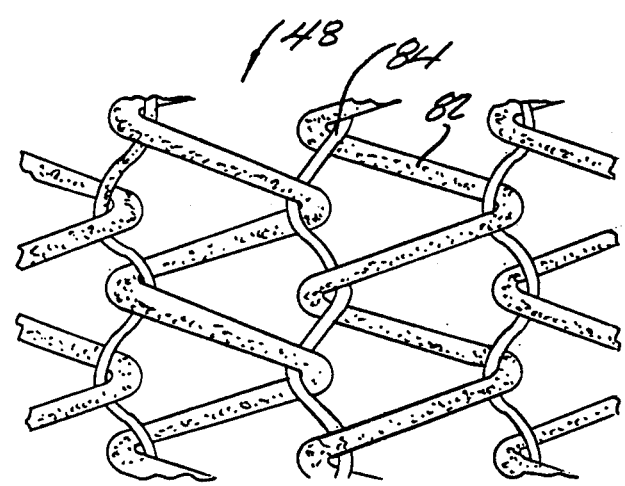
FIG. 8 is an enlarged fragmentary plan view of the belt and shows the constructional details thereof.

Reference is now made to FIG. 8 which is a partial plan view of both belts 48 and 64. These belts are of a wire mesh construction which includes a series connected by transverse wires 84. The wires 82, 84 are interwoven and each wire may be continuous. As is clearly shown in FIG. 7, from an end view of from a longitudinal section, each of the wires 82 has a link-like appearance. As a result, each of the belts 48, 64 is flexible in generally the same manner as is a chain and is free to pass around the respective supporting rollers.

The belt 64 carries at regularly spaced intervals buckets generally identified by the numeral 96. These buckets extend transversely of the belt 64.

Each bucket 96 is of a generally V-shaped section and includes a mounting plate 98 with the bucket per se being generally V-shaped in cross section. The bucket per se includes a plate portion 100 disposed parallel to the plate 98 and is in spaced relation thereto. The bucket per se also includes a sloping plate 102 which slopes from a short upstanding rear member 104 to a leading edge of the plate 98.

Each end of each bucket 96 is closed by an end plate 106 which, in FIG. 7, extends downwardly below the plate 100 to form a support portion 108.

Each bucket 96 is mounted relative to the belt 64 simply by inserting in respective ones of loops 110 defined by the wires 82 bars 112, 114. Each bucket 96 is mounted relative to the belt 64 by passing bolts 116 through slots 118 in the plate 98 and threading such bolts 116 into the associated bar 112.

Each bucket 96 is further mounted relative to the belt 64 by forming the plate 98 with bores 120 and passing further bolts 122 through the bores 120 and threading such bolts into the bar 114. Each bolt 122 resiliently connects the associated bucket 96 to the chain 64 while each bolt 116 rigidly secures each bucket 96 to the chain 64.

Each bolt 122 carries a thick resilient washer 124 between the head thereof and the plate 98 so as to permit relative movement between the plate 98 and the belt 64 providing for the resilience of the mounting of the bucket 96 when going around rollers.

Figure 5:
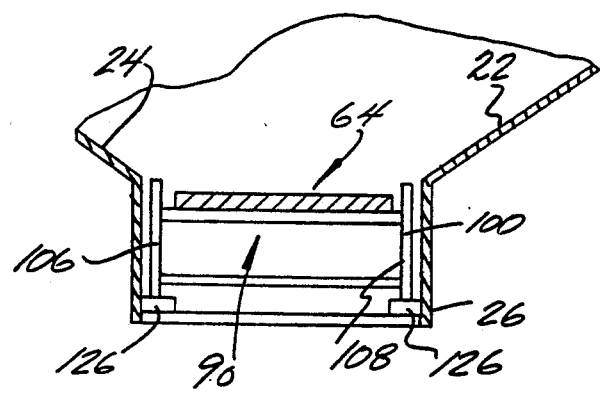
FIG. 5 is a fragmentary vertical sectional view taken generally along the line 5—5 of FIG. 3 and shows the specific details of the abrasive collection trough and the supporting of buckets therein.

Referring now to FIG. 5, it will be seen that the collection trough 26 has in the bottom thereof at each side thereof a rail 126 on which the support 108 of the side plates 106 ride. In this way the buckets 96 are maintained slightly above the bottom of the collection trough 26 as is shown in FIGS. 3 and 5.

Figure 7:
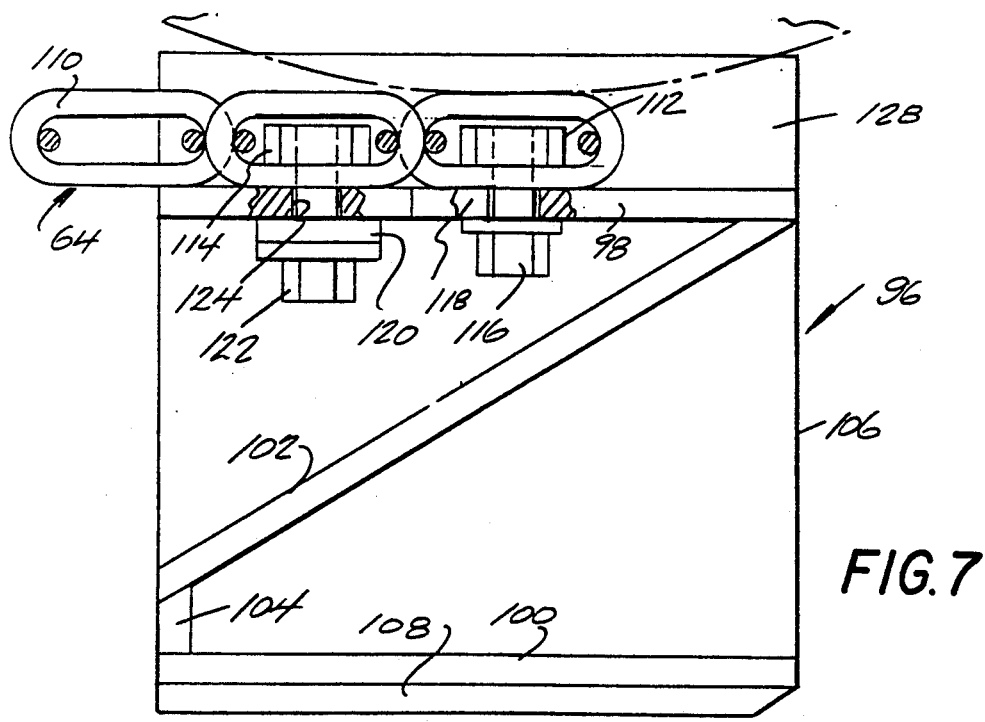
FIG. 7 is an enlarged fragmentary side elevational view of one of the buckets and the belt with parts broken away and shown in section.

It will also be seen from FIGS. 4, 5 and 7 that the sides 106 extend outwardly of the side edges of the belt 64 and include upper support portions 128. These support portions, along the upper run 68 ride on upper rails 130 carried by support brackets 132. The upper support portions 128 overlap the rollers to assure belt tracking.

It will be readily apparent from FIG. 3 that any foreign matter, including spent abrasive particles, disposed within the collection trough 26 is picked up by the buckets 96 and moved along the vertical run 92 and then to the horizontal run 68. Because of the shape of the buckets 96, the buckets are automatically dumped as the belt passes along the upper run 68 with the material from the buckets flowing through the belt 64.

As previously described, the upper run 68 overlies the bins or hoppers 70, 72 with the result that the material carried by the buckets 96 flows generally into the bin 70 but also into the bin 72. Should the bin 70 become filled to overflowing, the underside of the upper run 68 of the belt 64 will drag material from the bin 70 into the bin 72.

Flow out of the bins 70, 72 is controlled by an adjustable gate 134 for each bin. Thus flow out of the bins 70, 72 is in the form of a curtain flow with air passing through that curtain flow into a suction outlet 136 so as to clean the returning abrasive particles of dust and trash. The cleaned abrasive particles then fall into hoppers 138, 140 at opposite sides of the machine for delivering a supply of abrasive particles to the blast wheels 56, 58 at each side of the machine.

It is to be understood that a sufficient supply of abrasive particles is stored within the hoppers 138, 140 such that at times there may be an overflow of the abrasive particles. Such an overflow would pass over the lip of a respective hopper 138, 140 into overflow chutes 142 down past opposite side edges of the belt 48 into the collection trough 26.

Referring once again to FIG. 3, it will be seen that abrasive particles thrown from the blast wheels 56, 58 at each side of the upper run 54 of the belt 48 will be directed from opposite sides top and bottom, of an article A being cleaned so as to assure abrasive particles hitting all surfaces of the articles.

Although only a preferred embodiment of the cleaning machine has been specifically illustrated and described, it is to be understood that minor variations may be made not only in the cleaning machine, but also in the specific abrasive particle collection and distribution system without departing from the spirit and scope of the invention as defined by the appended claims.

I claim:

1. An abrasive cleaning machine comprising a conveyor in the form of an endless conveyor belt of an open construction through which abrasive particles may freely pass, said conveyor belt having a generally horizontal longitudinal upper run for supporting articles to be cleaned, at least one blast wheel for directing abrasive particles moving along said run, a transverse trough extending below said run for collecting spent abrasive particles, and return means for returning spent abrasive particles to said blast wheel, said return means including a second belt having exterior carrying buckets, and said second belt being of an open construction wherein abrasive particles may freely pass therethrough, said conveyor belt being of an open wire mesh construction, said second belt having a lower run presenting said buckets to said trough for collecting abrasives collected in said trough, said second belt in longitudinal cross section and transversely of said machine presenting series of interlocking loops, and each bucket being secured to said second belt by a longitudinally extending bar extending transversely of said second belt seated in said loops, and each bucket being secured to a respective bar, each bucket being supported by two of said base with each bucket being rigidly secured to one bar and resiliently secured to the other bar to permit said second belt to flex around roller type supports.

2. A machine according to claim 1 wherein said buckets have end supports, and there are rails for engagement by said end supports for supporting said buckets at least along said trough.

3. A machine according to claim 2 wherein each bucket is V-shaped in cross section and has a first wall remote from said belt disposed parallel to said belt and a second wall sloping from said first wall towards said belt whereby each bucket is self-dumping when passing along said upper run.

4. An abrasive return system comprising a collection trough, an endless belt having a lower generally horizontal pickup run extending generally through said trough, said belt having an exterior surface, and buckets secured to said exterior surface in transversely extending relation, said belt having an upper generally horizontal discharge run, and said belt being of an open construction providing means for the passage of abrasive particles through said lower run into said trough and the discharging and passage of abrasive particles through said upper run, said belt being of a flexible open wire mesh construction and in longitudinal section presenting a series of interlocking loops, and each bucket being secured to said belt by a longitudinally extending bar extending transversely of said belt seated in said loops, and each bucket being secured to a respective bar, each bucket being supported by two of said bars with each bucket being rigidly secured to one bar and resiliently secured to the other bar to permit said belt to flex around roller type supports.

5. An abrasive return system according to claim 4 wherein said buckets have end supports, and there are rails for engagement by said end supports for supporting said buckets at least along said trough.

6. An abrasive return system according to claim 5 wherein each bucket is V-shaped in cross section and has a first wall remote from said belt disposed parallel to said belt and a second wall sloping from said first wall towards said belt whereby each bucket is self-dumping when passing along said upper run.

7. A belt and bucket assembly comprising an endless belt having attached to one surface thereof a plurality of buckets, said belt being of a flexible open wire mesh construction presenting in longitudinal section a series of interlocking loops, and each bucket being secured to said belt by a longitudinally extending bar transversely of said belt and seated in said loops, and each bucket being secured to a respective bar, each bucket is supported by two of said bars with each bucket being rigidly secured to one bar and resiliently secured to the other bar to permit said belt to flex around roller type supports.

8. An assembly according to claim 7 wherein said buckets have end supports, and said end supports form means for engaging rails extending along a trough for supporting said buckets at least along said trough.

9. An assembly according to claim 8 wherein each bucket is V-shaped in cross section and has a first wall remote from said belt disposed parallel to said belt and a second wall sloping from said first wall towards said belt whereby each bucket is self-dumping when passing along an upper run of said belt.

10. An abrasive return system comprising a collection trough, an endless belt having a lower generally horizontal pickup run extending generally through said trough, said belt having an exterior surface, and buckets secured to said exterior surface in transversely extending relation, said belt having an upper generally horizontal discharge run, and said belt being of an open construction providing means for the passage of abrasive particles through said lower run into said trough and the discharging and passage of abrasive particles through said upper run, said buckets having end supports, and there being rails for engagement by said end supports for supporting such buckets at least along said trough.

* * * * *